(12) United States Patent
Grinshtain (10) Patent No.: US 12,188,700 B2
(45) Date of Patent: *Jan. 7, 2025

(54) ACTIVE RESPONSE COLD TREATMENT FOR REFRIGERATED CARGO

(71) Applicant: ARROWSPOT SYSTEMS LTD., Kfar Hess (IL)

(72) Inventor: Ran Menachem Grinshtain, Kfar Hess (IL)

(73) Assignee: ARROWSPOT SYSTEMS LTD., Kfar Hess (IL)

( * ) Notice: Subject to any disclaimer, the term of this patent is extended or adjusted under 35 U.S.C. 154(b) by 535 days.

This patent is subject to a terminal disclaimer.

(21) Appl. No.: 17/601,511

(22) PCT Filed: Apr. 5, 2020

(86) PCT No.: PCT/IL2020/050412
§ 371 (c)(1),
(2) Date: Oct. 5, 2021

(87) PCT Pub. No.: WO2020/202165
PCT Pub. Date: Oct. 8, 2020

(65) Prior Publication Data
US 2022/0196306 A1    Jun. 23, 2022

(30) Foreign Application Priority Data

Apr. 5, 2019  (IT) .................. 102019000005278

(51) Int. Cl.
*F25B 49/02* (2006.01)
*F25D 11/00* (2006.01)
*G05B 15/02* (2006.01)

(52) U.S. Cl.
CPC ............ *F25B 49/02* (2013.01); *F25D 11/003* (2013.01); *G05B 15/02* (2013.01)

(58) Field of Classification Search
CPC ......... F25B 49/02; F25D 11/003; G05B 15/02
(Continued)

(56) References Cited

U.S. PATENT DOCUMENTS

2011/0221573 A1   9/2011  Huat
2014/0180953 A1   6/2014  Westcott et al.
(Continued)

FOREIGN PATENT DOCUMENTS

CN   107101451 A   8/2017
WO   2012020098 A2   2/2012

*Primary Examiner* — Md Azad
(74) *Attorney, Agent, or Firm* — NKL Law; Jae Youn Kim (57) ABSTRACT

Methods and systems are provided for determining an active response during cold treatment of refrigerated cargo during shipment of a refrigeration container. Steps include: receiving a set point adjustment protocol for modifying set points of a refrigeration controller of the refrigeration container; during a period of active response operation, receiving temperature signals from a plurality of temperature probes located in the refrigeration container; determining that one or more of the received temperature signals exceeds a temperature threshold defined by the set point adjustment protocol; determining that a temperature trend of the one or more of the received temperature signals meets a trend trigger of the set point adjustment protocol; and, responsively to the temperature threshold and the trend trigger, transmitting a set point change command to the refrigeration controller.

13 Claims, 3 Drawing Sheets

(58) Field of Classification Search
USPC .......................................................... 700/300
See application file for complete search history.

(56) References Cited

U.S. PATENT DOCUMENTS

| | | | |
|---|---|---|---|
| 2015/0205308 A1* | 7/2015 | Huat | F25D 11/003 |
| | | | 700/300 |
| 2016/0216028 A1* | 7/2016 | Jónsson | F25D 11/003 |
| 2018/0347895 A1* | 12/2018 | Jonsson | G06Q 10/0832 |
| 2019/0277558 A1* | 9/2019 | Adetola | B65D 88/745 |
| 2019/0323767 A1* | 10/2019 | Meyers | G05D 23/1902 |

* cited by examiner

ACTIVE RESPONSE COLD TREATMENT FOR REFRIGERATED CARGO

RELATED APPLICATIONS

This application is a national phase entry of International Patent Application No. IL2020/050412, titled, "ACTIVE RESPONSE COLD TREATMENT FOR REFRIGERATED CARGO," filed Apr. 5, 2020, which claims the benefit of Italian Patent Application IT2019000005278, filed Apr. 5, 2019, the entire contents of which are hereby incorporated by reference.

FIELD OF THE INVENTION

The invention generally relates to agricultural product treatment, and in particular to treatment during cargo transport.

BACKGROUND

Temperatures of refrigerated cargo are often carefully monitored during ocean transport in order to comply with agricultural treatment protocols required by import regulations of most countries. In particular, many countries require that agricultural produce, especially citrus fruits, undergo a verified "cold treatment" (CT) for pest control in order to pass through customs. Cold treatment protocols are generally designed so as to destroy insect larvae in the cargo. The protocols vary depending on the country and the type of produce, but typically require that produce in a refrigerated container be maintained below a certain threshold temperature typically between −1° C. and 5° C. (such as 1.5° C.), for a treatment period such as two or three weeks.

An example of CT protocols for import of agricultural products from South Africa to the United States is provided at:
dhttps://ppecb.com/wp-content/uploads/2015/03/HP04U-PROCEDURE-FOR-IN-TRANSIT-COLD-TREATMENT-TO-ERADICATE-FRUIT-FLIES-IN-APPLES-AND-PEARS-SHIPPED-FROM-SOUTH-AFRICAN-PORTS-TO-THE-UNITED-STATES-OF-AMERICA.pdf An example of CT protocols for products to the U.S. is provided at:
https://www.aphis.usda.gov/import_export/plants/manuals/ports/downloads/treatment.pdf According to most protocols, it is necessary to place temperature probes, often referred to as "USDA probes," at locations within the refrigerated container, typically within the pulp of several pieces of fruit that are then placed in different crates.

During shipment, temperature measurements taken at regular intervals from the temperature probes may be logged in a certified data recorder (such as a DataCorder™), which may then subsequently be reviewed by customs inspectors or other regulators. A sample of a cold treatment log for inspection is provided in Table I, hereinbelow. The data recorder may also be connected or integral to a controller of a refrigeration unit of the refrigerated container.

Maintenance of constant temperatures during cold treatment is critical to the success of a shipment. If temperatures drop too low, the produce may be ruined from the cold. However, if temperatures rise even briefly above the maximum allowed temperature, the cold treatment may be invalidated. This may necessitate repetition of the cold treatment, thereby damaging the quality of the produce, or as is more common, the shipment may simply be destroyed.

Hereinbelow, the term "refrigerated container" (or "refrigerated cargo container") refers to any enclosure for transporting refrigerated cargo, such as standard-sized, intermodal containers, truck compartments, air freight boxes, and the like. The term refrigeration unit refers to the elements performing the refrigeration function inside such the refrigerated container, including the refrigeration compressor, valves and pipes.

SUMMARY

Embodiments of the present invention provide apparatus, methods and systems for controlling a cold treatment (CT) protocol for international produce transport. There is therefore provided by embodiments of the present invention a method of cold treatment (CT) of refrigerated cargo during shipment of a refrigeration container, implemented by an active response controller having one or more processors and having memory storage, the memory storage comprising instructions that when executed by the one or more processors implement steps including: receiving a set point adjustment protocol for modifying set points of a refrigeration controller of the refrigeration container; during a period of active response operation, receiving temperature signals from a plurality of temperature probes located in the refrigeration container; determining that one or more of the received temperature signals exceeds a temperature threshold defined by the set point adjustment protocol; determining that a temperature trend of the one or more of the received temperature signals meets a trend trigger of the set point adjustment protocol; and, responsively to the temperature threshold and the trend trigger, transmitting a set point change command to the refrigeration controller.

Some embodiments may include starting the active response operation responsively to determining that transport of the refrigeration container has begun. In further embodiments, determining that one or more of the received temperature sensor signals exceeds a temperature threshold includes identifying a highest temperature reading from among the temperature sensor signals, and comparing the highest temperature to the temperature thresholds of the set point adjustment protocol to determine the first set point change.

Embodiments may further include determining that a CT treatment period defined in the set point adjustment protocol has been reached and responsively transmitting a second set point change command to the refrigeration controller to increase the refrigeration controller set point to a post-CT treatment period temperature.

The instructions may include further steps such as determining that the maximum allowed CT temperature threshold has been exceeded and responsively reinitializing the CT treatment period. Embodiments may also include determining that the maximum allowed CT temperature threshold has been exceeded and responsively stopping the active response operation. Embodiments may also include reporting the received temperature signals, the first set point change command, and the second set point change command, to a remote computer, by transmissions over the telematics unit. Embodiments may further include determining that the CT treatment period defined in the set point adjustment protocol has been reached and stopping the active response operation.

There is also provided, by embodiments of the present invention, a system for cold treatment (CT) of refrigerated cargo during shipment of a refrigeration container, including a refrigeration controller, configured to receive standard sensor signals and USDA temperature probe signals, to control a refrigeration unit of the refrigeration container according to the standard sensor signals, and to record the USDA temperature probe signals for CT compliance tracking; a telematics unit, collocated with the refrigeration controller and configured to receive remote communications; and an active response controller having one or more processors and having memory storage, the memory storage comprising instructions that when executed by the one or more processors implement steps comprising: receiving, through a telematics unit, collocated with the active response controller, a set point adjustment protocol for modifying set points of a refrigeration controller of the refrigeration container; during a period of active response operation, receiving temperature signals from a plurality of temperature probes located in the refrigeration container, determining that one or more of the received temperature signals exceeds a temperature threshold defined by the set point adjustment protocol, determining that a temperature trend of the one or more of the received temperature signals meets a trend trigger of the set point adjustment protocol; and responsively to the temperature threshold and the trend trigger transmitting a set point change command to the refrigeration controller . . .

BRIEF DESCRIPTION OF DRAWINGS

For a better understanding of various embodiments of the invention and to show how the same may be carried into effect, reference will now be made, by way of example, to the accompanying drawings. Structural details of the invention are shown to provide a fundamental understanding of the invention, the description, taken with the drawings, making apparent to those skilled in the art how the several forms of the invention may be embodied in practice. In the accompanying drawings.

DETAILED DESCRIPTION

It is to be understood that the invention and its application are not limited to the methods and systems described below or to the arrangement of the components set forth or illustrated in the drawings, but are applicable to other embodiments that may be practiced or carried out in various ways.

Embodiments of the present invention provide methods and systems that provide active responses for cold treatment of refrigerated cargo. Some types of applicable refrigeration units are listed in Table II hereinbelow.

Figure 1:
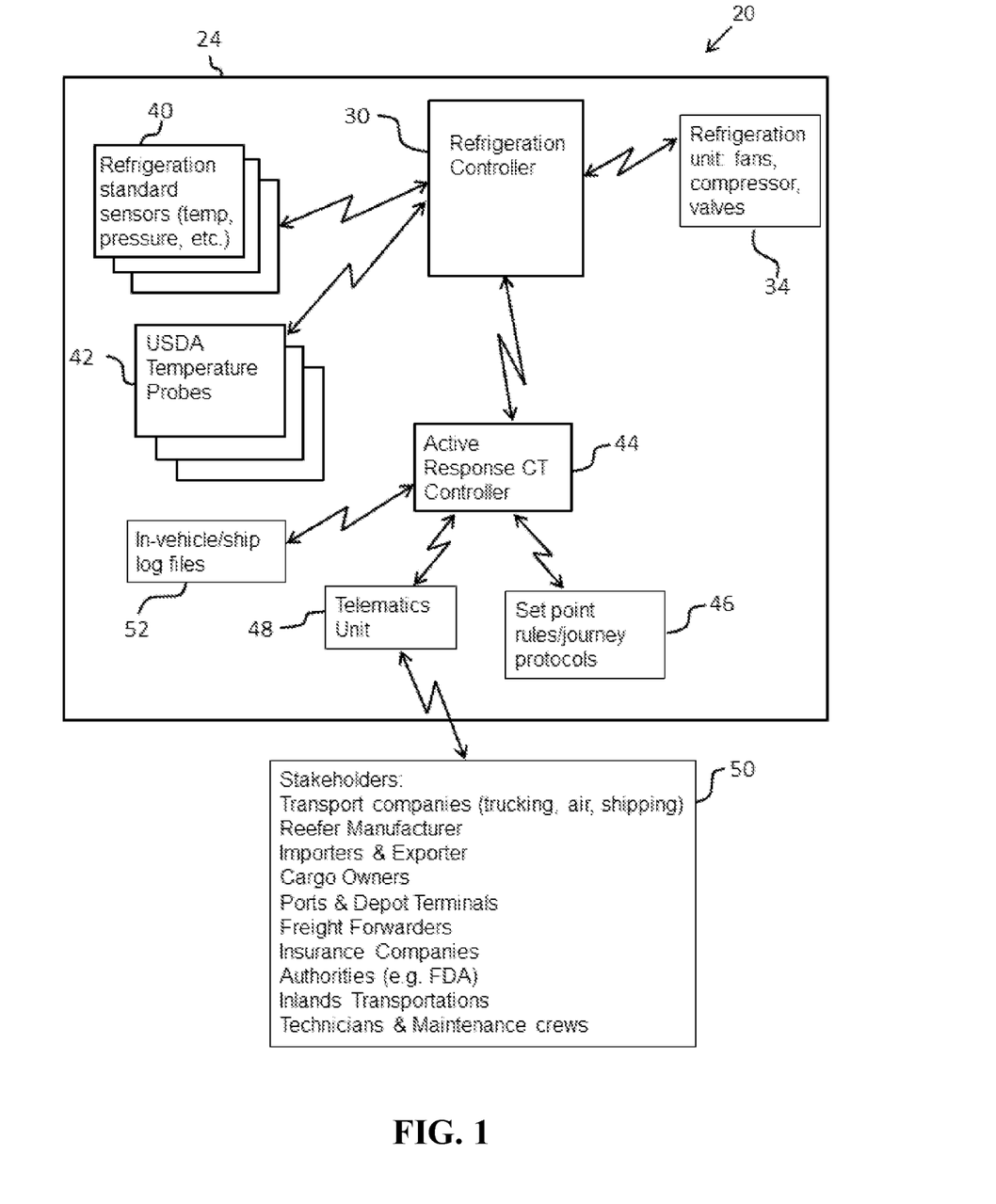
FIG. 1 is a schematic block diagram of a system providing active responses for cold treatment of refrigerated cargo, according to some embodiments of the present invention.

FIG. 1 is a schematic block diagram of a system 20 for providing active responses for cold treatment of refrigerated cargo shipped in a refrigerated container 24, according to some embodiments of the present invention. The refrigerated container 24 includes a refrigeration controller 30 that controls the operation of devices of a refrigeration unit 34, such as compressors, fans, and valves. The refrigeration controller 30 may be configured with preset settings, such as a preset target "set point" temperature to be maintain during the course of a shipment. During the course of the shipment, the refrigeration controller 30 receives input signals from standard refrigerator sensors 40. Standard sensors 40 are sensors that are typically installed by suppliers of refrigeration units. The standard sensors may include sensors to measure the cargo container air temperature at locations such as the refrigeration unit supply and return air vents. Temperatures and pressures of the refrigeration gas at different points in the refrigeration cycle (such as evaporator, condenser, and compressor points) may also be measured. An ambient temperature sensor is also typically provided to measure the temperature outside the refrigeration unit.

Typically, a sensor at one reference location, such as the refrigeration unit supply vent, is used as a reference temperature, and the refrigeration controller 30 controls aspects of the refrigeration unit, including powering the refrigeration unit compressor and fans, in order to maintain the set point temperature at the reference location. There may be a variation of 1 to 2 degrees Celsius throughout the refrigerated container, because of non-uniform air flows and imperfect insulation within the refrigerated container.

In addition to the standard sensors 40, the refrigerated container 24 includes a set of USDA or similarly certified temperature probes 42, which are designed to be inserted into agricultural produce, such as citrus fruits, in order to measure the pulp temperature and to monitor temperature conformance to national inspection standards. In typical configurations, three USDA temperature probes (referred to hereinbelow as temperature probes, or simply as probes) are installed in a refrigerated container before shipping. Most cold treatment protocols require temperatures measured by all three probes to be less that a maximum cold treatment temperature throughout a treatment period. The probes may be connected directly to the refrigeration controller 30 or to a separate data recorder. Typically, the temperature probe readings are logged (i.e., stored) in memory of the refrigeration controller for subsequent access, for example for reporting of cold treatment conformance to inspection officials.

In some embodiments of the present invention, the refrigeration controller 30 also includes or is connected to an active response controller or module 44, which provides "active responses" to cold treatment temperature variations, in order to maintain conformance to cold treatment protocols, as described further hereinbelow. In some embodiments, the active response controller 44 may be an auxiliary processor that is installed in the container in addition to the standard refrigeration controller. That is, the auxiliary processor may be a unit separate from the refrigeration controller, as indicated in the figure. Installing the active response controller as an auxiliary processor overcomes the need to modify the refrigeration controller, which is typically a proprietary, closed system that cannot be modified by third parties.

The active response controller 44 may be configured to acquire and to process data received from the refrigeration controller, including the USDA temperature probe readings. Data from the refrigeration controller may be received by wireless or wired methods known in the art, such as Bluetooth or RS-232 connections. Typically, readings are made every few minutes, for example once every two minutes.

In some embodiments, the active response controller 44 is connected to or is an integral part of a collocated telematics unit 48. The telematics unit provides telematics functions, such as sending and receiving wireless communications over satellite and/or GSM connections. Through the telematics unit, communications can be transmitted to and from control units of the refrigerated container, including the refrigeration controller and the active response controller.

Either through local operation or by means of remote communications provided by the telematics unit, the active response controller 44 may be configured to receive and to store a set of protocols 46. The protocols define actions that the active response controller is to take when set to an "active response mode." Conditions provided by the protocols include time schedules, in particular the period of time required for a cold treatment, and temperature thresholds that indicate how variations in probe temperatures should affect the active response controller actions. Typically, multiple protocols are stored by the active response controller, each protocol being specific for a given type of cargo and a destination.

Similarly, the active response controller 44 may also receive and store parameters regarding a current shipment that is to begin or has begun. These parameters may include a destination port and a type of cargo, which are then correlated by the active response controller to the received protocols, in order to determine a "current protocol." The current protocol, that is, a protocol specifying actions to be performed by the active response controller during the current or upcoming journey, may also be transmitted from a remote operator through the telematics unit. The current protocol may also be changed by means of remote communication while a ship is in transit.

Parameters of a current protocol include: the duration time of the cold treatment to be performed, the upper temperature limit according to the destination port regulations, and the set point to be implemented at the end of the cold treatment period. Parameters also include set point adjustment protocols, which indicate the conditions that trigger the active response controller to change the refrigeration controller temperature set point. As described further hereinbelow, the trigger conditions of the set point adjustment protocols may include temperatures and temperature trends (i.e., temperature changes, "$\Delta T$"), which may be measured by the USDA probe temperatures and by the ambient temperature sensor.

The active response controller may also transmit these parameters to remote users in response to queries, and may also provide data regarding temperature compliance from the start of a cold treatment and remaining time left before the end of a cold treatment. It is to be understood that he telematics unit permits a remote staff to have control over the active response controller to ensure proper operation of the cold treatment described herein.

Table III hereinbelow includes some examples of a set point adjustment protocol, for a given shipment of a given type of produce. For example, a citrus fruit shipment en route to Japan must be kept below 1.5° C. for a period of at least 16 days (384 hours). As indicated in the table, the set point adjustment protocol for such a combination of cargo and destination includes specification of an initial set point of the refrigeration controller at 0.5° C. In addition, the specification includes temperature thresholds and temperature trend triggers that determine how the set point is to be changed. These thresholds and triggers are determined by measuring the temperature response of probes over the course of multiple shipment journeys, applying different trend and temperature triggers, to minimize CT failures (i.e., overshooting the minimum or maximum temperatures) and to optimize the stability of probe temperatures over the course of CT. The temperature threshold and trend trigger conditions may be dependent on multiple factors including a type of produce, shipment route, a carrier, cargo loading and an individual refrigeration unit performance; that is, set point adjustment protocols may be specified for specific type of produce, shipment route, a carrier, cargo loading and an individual refrigeration unit performance. Table III lists a subset of rules a typical set point adjustment protocol. In some embodiments, the set adjustment protocol may be defined as one or more equations defined by temperature threshold and trend trigger factors.

If the cold treatment is performed successfully, that is, if the temperature is successfully maintained below the maximum CT temperature (1.5° C. in the example) throughout the CT period (e.g., 16 days), then the refrigeration set point should subsequently be raised to a post CT temperature (e.g., 8° C.), a temperature that is more appropriate for fruit preservation.

In embodiments of the present invention, the active response controller is activated when a cold treatment begins. Once activated, the active response controller tracks temperature variations measured by the temperature probes, and in response, makes adjustments to the refrigeration controller's set point. The set point change is made in order to reduce the chance of the probe temperatures rising above the maximum allowed temperature (thereby invalidating the cold treatment), or falling below a minimum temperature (typically 0° C.) that would affect the produce quality (e.g., ruin the fruit).

As indicated in Table III, when the maximum allowed temperature is, for example, 1.5° C., and the minimum temperature is 0° C., the active response controller is configured to maintain the temperature of all the probes between a low trigger temperature of 0.3° C. and a high trigger temperature of 1.2° C. To maintain this range, the active response controller responds when any individual probe reading reaches either the low or the high trigger temperature, i.e., the operation proceeds according to whether the high or low range is in danger of being exceeded. In addition, operation proceeds according to the temperature trend (rate of temperature "$\Delta T$") of the extreme probe. In general, the active response controller avoids changing the set point for a temperature trend of small increments When the active response controller sends a set point change command to the refrigeration controller, the active response controller may also send an alert (by means of the telematics unit) to remote stakeholders, indicated in FIG. 1 as stakeholders 50. Actions by the active response controller may also be logged to a ship log file 52 for future review.

The set point adjustment protocols vary depending on the type of cargo and the destination. In addition, the protocols may vary depending on the types of refrigeration controller and refrigeration unit, as well as on the equipment wear and the loading of the refrigerated controller (i.e., how full the container is packed). Set point change commands are issued based on different temperature measurements according to the protocol. As indicated by the set point adjustment protocol of Table III, for which the maximum CT temperature is 1.5° C., an initial set point is set to 1.2° C. This is the target of the highest temperature that may be measured by any of the probes, given the temperature variation throughout the container. As shown in the protocol, in order to maintain 1.2° C. as the highest temperature anywhere in the refrigerated container, the initial refrigeration controller temperature set point is initially set to 0.5° C. Typically this means that the range of temperatures existing in the refrigerated controller is between 0.3° C. (at the refrigeration unit supply vent) and 1.2° C.

Subsequently, if the temperature begins to rise (that is, if any probe measures a higher temperature than the threshold, or "action trigger" of 1.2° C.), the active response controller (after being activated to operate in "active response" mode) tracks the trend of temperatures for prior periods. Trends may be determined by linear regression, based on multiple frequent temperature readings, such as readings of probe temperatures every few minutes. Trends over multiple time periods may be analyzed by multiple linear regression, such as periods covering the prior 2, 4, 6, and 8 hours. As indicated, if the temperature passes 1.2° C. at a slow rate of increase (less than. 0.0003° C./min for 120 minutes) The lower set point will cause the refrigeration unit to gradually reduce the temperature range within the refrigerated container. For example, if the temperature, as measured by the temperature probes, rises to an "action threshold" temperature of 1.2° C., then the active response controller issues a command to the refrigeration controller to reduce the set point, depending on the trend. Indicated in the table are trends of 2 hour minimum, but other periods of time may also set trends, given that the probes (placed inside fruit in containers) are slow to react to the refrigeration supply vent temperature changes, and are also affected by ambient temperatures. As shown in the protocol exemplary conditions listed in Table III (in the "delta" column of the first 1.2° C. row), the active response controller issues a set point change command only if the previous period had a trend of at least 0.0003° C./min for 120 minutes. Otherwise, the active response controller continues to wait and may hit 1.3° C. before determining a need to change the set point. The set point adjustment protocol may also include conditions with respect to ambient temperature conditions and time of day. For example, increasing the minimum trend rate required to decrease the set point if night is approaching, as this will reduce the ambient temperature. The set point adjustment protocol facilitates prediction of the temperature trend, so as to reduce unnecessary changes in the set point. Unnecessary changes can cause multiple undesirable effects, such as oscillation of temperatures that can lead to overshooting the temperature limits of the CT protocol.

The set point adjustment protocol also establishes conditions for increasing the set point after it has been reduced to avoid overshooting the maximum temperature. Similarly, the set point adjustment protocol establishes conditions for increasing the set point to avoid overshooting the minimum temperature, by the probe with the lowest temperature, and for subsequently reducing the set point once the temperature and temperature trend of the lowest probe begin to rise again.

In some embodiments, the active response controller also receives data from the refrigeration controller, including a current temperature set point. If the current temperature set point is different than the set point set by the active response controller, the active response controller may stop its active response operation until instructed otherwise, as the new set point indicates that the refrigeration controller is receiving manual, as opposed to automated, set point updates.

The active response controller may also be configured such that if the set point is set to 0.1° C. for an extended duration, such as 50 hours, without succeeding in reducing the probe temperatures, then the set point may be changed back to 0.3 and an alert may be sent to a stakeholder/operator (by means of the telematics unit). The active response mode of operation may be stopped until a new operating command is received from the stakeholder/operator. When the temperature change does not change for a long duration, it may be an indication that an element of the system is not functioning properly. Similar operation of issuing an alert and waiting for a new command may be performed if two probes reach opposite extremes, i.e., one probe reaches the high trigger temperature and a second probe reaches the low trigger temperature.

Probe temperatures may vary because of the differences between containers with respect to hardware age and wear, which may also affect elements such as the shell of the container and the refrigeration unit. Typically, the highest probe temperature is used to determine active responses when the temperature is close to the upper limit of the CT maximum temperature. Alternatively, the lowest probe reading may determine the action taken by the active response when it is close to the minimum temperature.

While the active response controller 44 is in operating mode, that is, while monitoring probe temperatures and reacting according to the current protocol, the active response controller may also transmit temperature and cold treatment status data in real time, as well as additional data regarding container status, to electronic addresses (e.g., email or other forms of electronic messaging) of multiple parties, that is, to the stakeholders 50, who include operators and owners who have a stake in the success of the transport. Rules may also be annotated to indicate that alerts should be issued to some or all stakeholders including notices regarding events, such as the following:

"Active Cold Treatment Start/Stop": A start notice is issued when the active response controller starts operating, generally at the start of cargo transport, and when it stops, generally at the end of a successful cold treatment.

"Cold Treatment setup not the same as the rule": Issued if the current protocol is different from the stored protocol for the given cargo and destination.

"USDA out of limit": Issued if the temperature of one of the USDA temperature probes is above the CA limit.

"Cold Treatment failed": Issued if the temperature goes above the CT maximum temperature, for a duration that invalidates the cold treatment According to regulations of the destination country.

"Cold Treatment Success": Issued when the duration of cold point successfully reaches the required time period without the temperature acceding the limit.

The stakeholders 50 who may receive notifications from the active response controller may include:

Transport Companies (trucking, air freight, and/or shipping companies)
Container Manufacturers
Importers & Exporters
Cargo Owners
Port & Depot Terminal Operators
Freight Forwarders
Insurance Companies
Government Authorities (e.g., FDA)
Inland Transportation Companies
Technicians & Maintenance Crews Different stakeholders may have a variety of reasons for tracking the container conditions described above while freight is in transit. For example, failure to meet a cold treatment will have implications for supply chains and for insurance commitments.

Transmissions may be sent to stakeholders by the telematics unit 48. The telematics unit 48 may be configured to employ satellite communications while freight is at sea, and GSM communications during land transport. In some embodiments, the telematics unit 48 may also serve as the auxiliary processor described above, such that the active response controller 44 is executed by the telematics unit rather than by a separate processor or by the refrigeration controller 30.

If means of communications are not available for real time communications, status data (i.e., predicted container conditions), as well as raw data (sensor signal data) may be stored in the log files 52 associated with the active response controller 44. The log files can also be stored in the telematics device 48. The set point adjustment protocols may be defined in tabular form as indicated in Table V.

Figure 2:
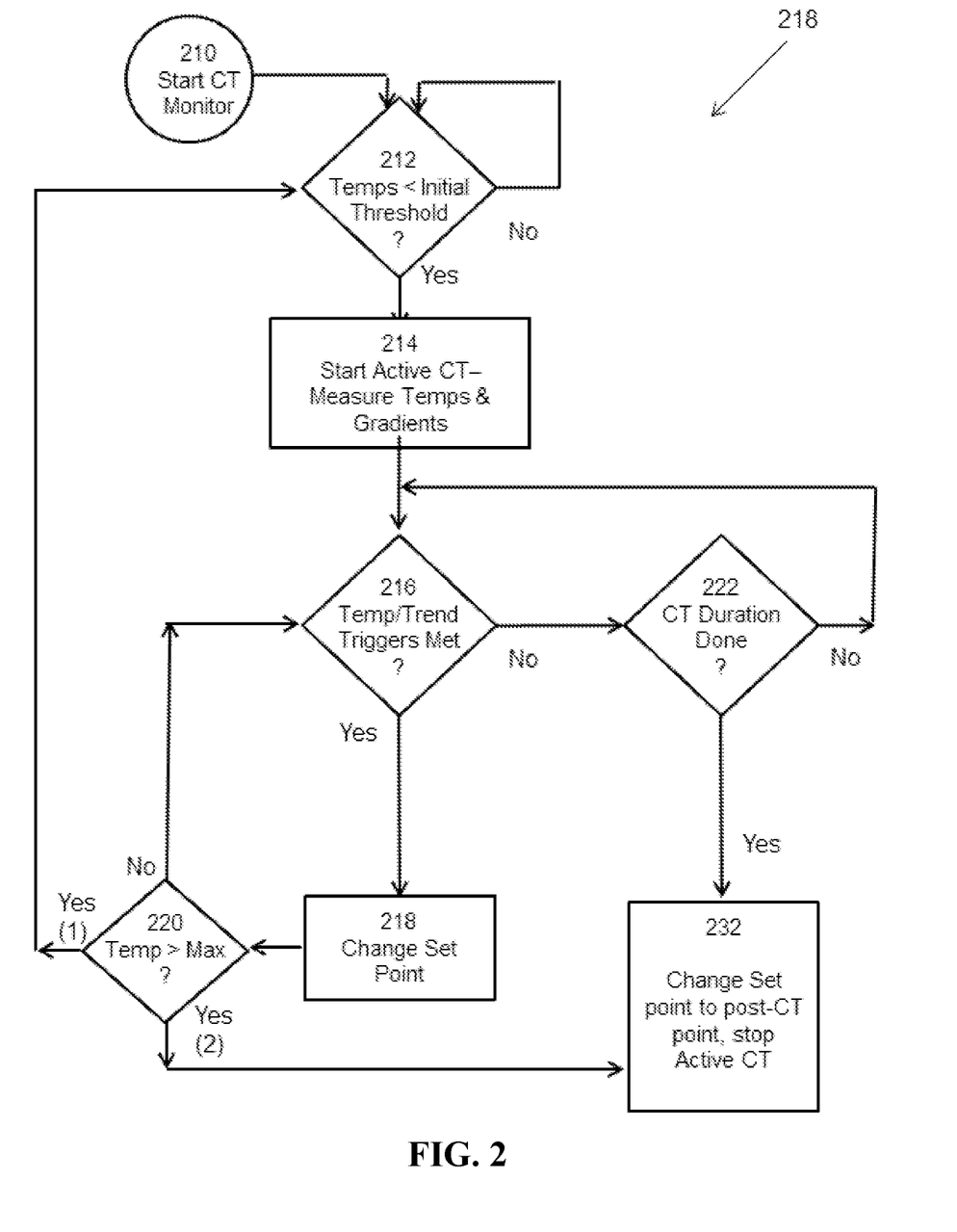
FIG. 2 is a flow diagram of a process of providing active responses for cold treatment of refrigerated cargo, according to some embodiments of the present invention.

FIG. 2 is a flow diagram of a process 200 for remote monitoring of a refrigerated container, according to some embodiments of the present invention. The first stage of the process 200 includes an initiation process 210, by which the active response controller receives shipment parameters (including cargo type and destination), as well as receiving protocols (including rules and actions with respect to monitoring a cold treatment, as described above). These parameters may be transmitted to the active response controller before a shipment begins and before the active response controller begins monitoring a process of cold treatment. These parameters may also be updated during a shipment and/or during a cold treatment. In some embodiments, the refrigeration controller receives the parameters of CT maximum temperature, duration, and initial set point, and these are read by the active response controller from the refrigeration controller. As described above, updates are typically performed by means of communications through the telematics unit.

Typically the refrigeration controller is set to the initial set point close to the time that a shipment begins, though the actual start may begin before or after or concurrently with the start of a shipment. The active response controller is started at the step 210 and begins monitoring the probe temperatures at a step 212. The cold treatment actually starts when the probe temperatures drop below the initial threshold. As described above with respect to Table III, if the maximum CT temperature is 1.5° C., the set point may be 0.5° C. and the initial high temperature trigger may be 1.2° C. Once the temperature falls below 1.2° C., the active response mode may begin at a step 214.

At a step 216, active response controller begins to monitor the probe temperatures. In some embodiments, monitoring may be every minute or every few minutes. Actions implemented during the active CT process may include issuing set point change commands, issuing alerts, changing the CT schedule and stopping the active monitoring. Typically, threshold temperatures that determine actions are indicated by increments of a tenth of a degree Celsius. Temperature trends that determine actions are typically measured in degrees per minute or degrees per hour, as described above with respect to Table III.

While probe temperatures remain either between the upper and lower trigger temperatures or temperature trends do not reach trigger levels indicated by Table III, monitoring continues (step 214 is repeated), while the CT duration is also tested (step 222). If the CT duration is complete (for example, 16 days), then at a step 232 a new set point is set to a post-CT temperature that helps to preserve the fruit for the duration of a shipment. In addition, the active CT process ends, meaning that the active response controller ceases to interfere in the set point of the refrigeration controller, unless a new remote instruction is received from operators.

If the probe temperatures and trends hit triggers levels of the set point adjustment protocol, the active response controller activates a set point change (step 218). As described above, the set point is generally decreased if the temperature if the upper temperature trigger level is passed, with a sufficiently "steep" positive trend, and, conversely, it is increased if the lower temperature trigger is reached at a sufficiently steep negative trend. Trend tracking prevents unnecessary temperature oscillation, while facilitating aggressive set point responses if there is a sudden, dramatic probe temperature change. The set point adjustment protocol may specify, for a sudden probe temperature change, a set point change of 0.2 or 0.3° C.

At step 218, the active response controller issues a new set point change command to the refrigeration controller.

If a temperature reading exceeds the maximum CT temperature at some point during the CT treatment (step 220), a further action by the active response controller may be to restart the CT treatment (repeating step 212, option Yes-1). This means waiting until the probe temperatures are below the maximum CT temperature and then restarting the period of time that the maximum CT temperature must not be exceeded. Alternatively (option Yes-2), when the CT temperature is exceeded, the action defined may be to set the temperature to a post-CT temperature specified in the protocol, assuming that the CT treatment will be repeated at a later time (step 232).

After setting the temperature to a post-CT temperature, which helps to preserve the fruit, the active response controller may also stop monitoring, at the step 232, that is, it may stop its operation of active response mode. The active response controller may also send alerts and log its actions, as described above.

If the active response mode has not been stopped, the monitoring process continues at the step 214. If stopped, the active response controller may wait for new instructions to be transmitted by means of the telematics unit.

An additional aspect of the protocols described above might also cover a situation of power off. For example, after power is restored, the protocol may specify a wait period, for example of two hours, before the active response controller begins operating again, monitoring the temperatures indicated by the temperature probe and changing the set point as indicated by the set point adjustment protocol.

Figure 3:
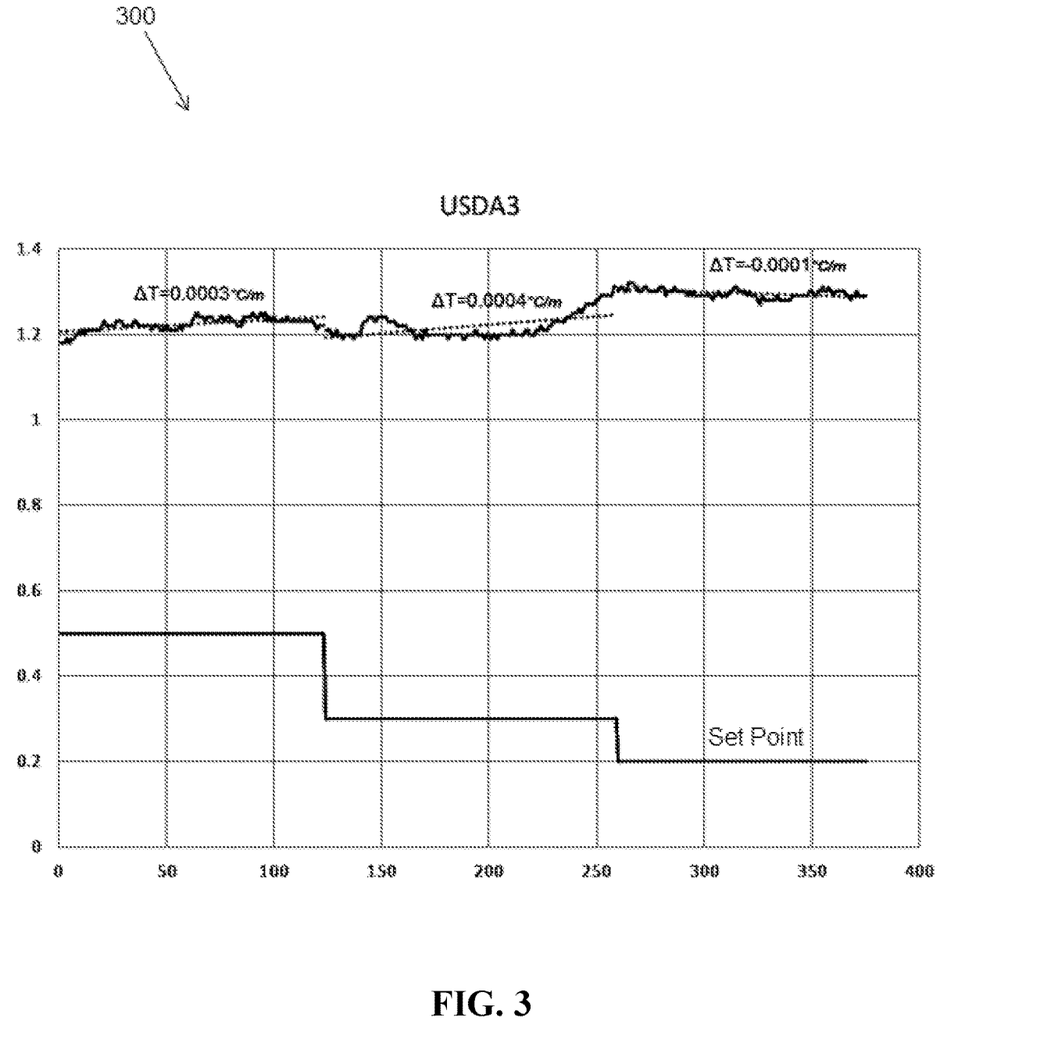
FIG. 3 is a graph of temperature sensor readings during cold treatment, according to some embodiments of the present invention.

FIG. 3 is a graph 300 of temperature sensor readings during a period of active response operation, according to some embodiments of the present invention. The x-axis indicates minutes; the y-axis indicates degrees. In the example indicated, a set point is set at 0.5° C. when the temperature reaches an upper temperature trigger of 1.2° C. The trend prior to reaching 1.2° C. was not sufficient to trigger a set point change, and the subsequent trend does not reach a trigger of 0.0003° C./min until approximately 120 minutes have passed. At that point, according to the set point adjustment protocol (based on the conditions listed in Table III), the active response controller issues a set point change to the refrigeration controller, changing the set point to 0.3° C. Similarly, after another two hours, an additional rule of the set point adjustment protocol is triggered, causing the active response controller to issue an additional set point change to 0.2° C. Subsequently, the temperature seems to be stable at 1.3° C., which does not warrant making a change, according to the set point adjustment protocol.

Computational aspects of process 200 and of system 20 may be implemented in digital electronic circuitry, or in computer hardware, embedded firmware, software, or in combinations thereof. All or part of the process may be implemented as a computer program product, tangibly embodied in an information carrier, such as a machine-readable storage device or in a propagated signal, for execution by, or to control the operation of, data processing apparatus, such as a programmable processor, computer, or deployed to be executed on multiple computers at one site, or distributed across multiple sites, including cloud configurations. Memory storage may also include multiple distributed memory units, including one or more types of storage media. A computing system configured to implement the system may have one or more processors and one or more network interface modules. Processors may be configured as a multi-processing or distributed processing system. Network interface modules may control the sending and receiving of data packets over networks.

It is to be understood that the scope of the present invention includes variations and modifications thereof which would occur to persons skilled in the art upon reading the foregoing description and which are not disclosed in the prior art.

TABLE I

Exemplary cold treatment log

ZMOU 8827069

| DATE | TIME | SET POINT TEMP. ° C. | SUPPLY AIR TEMP. ° C. | USDA 1° C. | USDA 2° C. | USDA 3° C. |
|---|---|---|---|---|---|---|
| 9 Jan. 2019 | 07:00 | | | | | |
| | 16:00 | | | | | |
| 10 Jan. 2019 | 07:00 | | | | | |
| | 16:00 | | | | | |
| 11 Jan. 2019 | 07:00 | | | | | |
| | 16:00 | | | | | |
| 12 Jan. 2019 | 07:00 | | | | | |
| | 16:00 | | | | | |
| 13 Jan. 2019 | 07:00 | | | | | |
| | 16:00 | | | | | |
| 14 Jan. 2019 | 07:00 | | | | | |
| | 16:00 | | | | | |
| 15 Jan. 2019 | 07:00 | | | | | |
| | 16:00 | | | | | |
| 16 Jan. 2019 | 07:00 | | | | | |
| | 16:00 | | | | | |
| 17 Jan. 2019 | 07:00 | | | | | |
| | 16:00 | | | | | |
| 18 Jan. 2019 | 07:00 | | | | | |
| | 16:00 | | | | | |
| 19 Jan. 2019 | 07:00 | | | | | |
| | 16:00 | | | | | |
| 20 Jan. 2019 | 07:00 | | | | | |
| | 16:00 | | | | | |

TABLE II

Refrigerated Container Types
All products noted below are trademarks of the indicated companies.

Refrigerated containers may include the following commercial products

| | |
|---|---|
| Carrier Transicold | EliteLINE, ThinLINE, PrimeLINE, NaturaLINE, PrimeLINE ONE |
| THERMO KING | Magnum |
| DAIKIN | LXE, ZESTIA |
| MAERSK CONTAINER INDUSTRY-STAR COOL | STAR COOL |
| KLINGE TEMPERATURE CONTROL | Military Air Conditioning Unit, Military Refrigerated A-Frame Container, Multi-Temperature & Single Temperature Zone Military Refrigerated Containers, Blast Freezer Container, Deep Freezer Container, Explosion-Proof Refrigerated Container, Dual Refrigerated & Integral Generated Set. |

Light commercial vehicles (LCV), including trucks, vans and other vehicles may include fixed refrigerated containers, such as the following commercial products.

| | |
|---|---|
| Carrier Transicold | Neos, Pulsor, Vanta, Viento, Xarios, Zephyr, Iceland, Supra, Syberia |
| THERMO KING | B-100, V-220, V-320, V-520, V-800, T-580, T-680, T-880, T-1080, T-1280 |
| TKT | TKT-20, TKT-40, TKT-50, TKT-60, TKT-200, TKT-300, TKT-400, TKT-600, TKT-800, TKT-900, TKT-1000, TKT-1200 |
| HWA SUNG | HWA SUNG series |

Truck trailers with refrigerated compartments for transport of perishable goods may include the following commercial products.

| | |
|---|---|
| Carrier Transicold | Vector |
| THERMO KING | PRECEDENT S-600, PRECEDENT S-700, PRECEDENT C-600, PRECEDENT S-610M, PRECEDENT C-610M, PRECEDENT 5-610DE, Heat King |

TABLE II-continued

Refrigerated Container Types
All products noted below are trademarks of the indicated companies.

Packages or boxes for cargo/goods that contain an active refrigerator cooling or heating system may include the following commercial products.

| | |
|---|---|
| ENVITOTAINER | RAP, RKN |
| KOREAN AIR | All refrigeration series |
| PHARMA PORT | All refrigeration series |
| SAFE | All refrigeration series |
| AIR CARGO | All refrigeration series |

TABLE III

Exemplary set point adjustment protocols

CT max temp = 1.5° C.
min = 0° C., initial
set point 0.5° C.

| When highest probe temp hits | ΔT (linear regression) | Reduce set point to: |
|---|---|---|
| 1.2° C. at set point of 0.5° C. | at least .0003° C./min for minimum of 120 minutes | 0.3° C. |
| 1.2° C. at set point of 0.3° C. | at least .0004° C./min for min 120 minutes | 0.2° C. |
| 1.3° C. at set point of 0.5° C. | at least .0003° C./min for min 120 minutes | 0.3° C. |
| 1.3° C. at set point of 0.5° C. | at least .0002° C./min for min 6 hours | 0.4° C. |

TABLE III-continued

Exemplary set point adjustment protocols

| CT max temp = 1.5° C. min = 0° C., initial set point 0.5° C. | ΔT (linear regression) | |
|---|---|---|
| 1.3° C. at set point of 0.3° C. | at least .0002° C./min for min 120 minutes | 0.2° C. |
| 1.3° C. at set point of 0.2° C. | at least .0001° C./min for min 120 minutes | 0.1° C. |
| . . . | | |

| When highest probe temp drops to | | Increase set point to: |
|---|---|---|
| 1.2° C. at set point of 0.3° C. | at least −0.0002° C./min for min 120 minutes | 0.4° C. |
| 1.1° C. at set point of 0.4° C. or less | at least 0.0000° C./min for min 120 minutes | 0.4° C. |
| . . . | | |

| When lowest probe temp drops to | | Increase set point to: |
|---|---|---|
| 0.3° C. at set point of 0.5° C. | at least −0.0003° C./min for min 120 minutes | 0.6° C. |
| 0.3° C. at set point of 0.6° C. | at least −0.0005° C./min for min 120 minutes | 0.7° C. |
| . . . | | |

TABLE IV

Rules and initial temperature set points for different commodities & countries

| Variety | Protocol Max Temp | Duration | Set. Temp. (° C.) | Post C.T. Temp. (° C.) | Alert Temp. (° C.) |
|---|---|---|---|---|---|
| Japan | | | | | |
| Sunrise (Red, White grapefruit) | 1.5 | 16 days | 0.3 | 8 | Below 0.3 and above 1.2 |
| Sweeties | 2.2 | 18 days | 0.5 | 8 | Below 0.3 and above 1.2 |
| Or | 2.2 | 18 days | 0.5 | 2 | Below 0.3 and above 1.8 |
| Red Pomelo Chandler | 1.5 | 16 days | 0.3 | 8 | Below 0.3 and above 1.2 |
| Australia | | | | | |
| Persimmon | 1.1 | 14 days | −1 | −1 | Below −1.5 and above 0 |
| Or | 2.2 | 16 days | 0.5 | 2 | Below 0.3 and above 1.8 |
| Santina | 2.2 | 16 days | 0.5 | 4 | Below 0.3 and above 1.8 |
| Sunrise | 2.2 | 16 days | 0.5 | 8 | Below 0.3 and above 1.8 |
| Minneola | 2.2 | 16 days | 0.5 | 6 | Below 0.3 and above 1.8 |
| Sweeties | 2.2 | 16 days | 0.5 | 8 | Below 0.3 and above 1.8 |
| Orange | 2.2 | 16 days | 0.5 | 6 | Below 0.3 and above 1.8 |

TABLE IV-continued

Rules and initial temperature set points for different commodities & countries

| Variety | Protocol Max Temp | Duration | Set. Temp. (° C.) | Post C.T. Temp. (° C.) | Alert Temp. (° C.) |
|---|---|---|---|---|---|
| USA | | | | | |
| Or | 2.2 | 18 days | 0.5 | 2 | Below 0.3 and above 1.8 |
| Ora | 2.2 | 18 days | 0.5 | 5 | Below 0.3 and above 1.8 |
| Sweeties | 2.2 | 18 days | 0.5 | 8 | Below 0.3 and above 1.8 |
| Orange | 2.2 | 18 days | 0.5 | 6 | Below 0.3 and above 1.8 |
| Persimmon | 2.2 | 18 days | −1 | −1 | Below −1.5 and above 0 |
| Korea | | | | | |
| Sunrise (Red, White grapefruit) | 2.2 | 18 days | 0.5 | 8 | Below 0.3 and above 1.8 |
| Sweeties | 2.2 | 18 days | 0.5 | 8 | Below 0.3 and above 1.8 |

The invention claimed is:

1. A method of cold treatment (CT) of refrigerated cargo during shipment of a refrigeration container, implemented by an active response controller having one or more processors and having memory storage, the memory storage comprising instructions that when executed by the one or more processors implement steps comprising:
   receiving, at the active response controller, a set point adjustment protocol including multiple rules for modifying temperature set points of a refrigeration controller of the refrigeration container, wherein conditions of the rules include temperature thresholds and temperature trend triggers, wherein temperature trend triggers are rates of temperature change;
   during a period of active response operation, receiving temperature signals from a plurality of temperature probes located in the refrigeration container;
   determining that one or more of the received temperature signals exceeds a temperature threshold of a rule of the multiple rules defined by the set point adjustment protocol;
   determining that a temperature trend of the one or more of the received temperature signals meets a trend trigger of the rule; and
   responsively transmitting a set point change command of the rule to the refrigeration controller.

2. The method of claim 1, further comprising starting the active response operation responsively to determining that transport of the refrigeration container has begun.

3. The method of claim 1, wherein determining that one or more of the received temperature signals exceeds the temperature threshold comprises identifying a highest temperature reading from among the temperature sensor signals, and comparing the highest temperature to the temperature thresholds of the multiple rules of the set point adjustment protocol.

4. The method of claim 1, further comprising determining that a CT treatment period defined in the set point adjustment protocol has been reached and responsively transmitting a second set point change command to the refrigeration controller to increase the refrigeration controller set point to a post-CT treatment period temperature.

5. The method of claim 4, wherein determining that the CT treatment period defined in the set point adjustment protocol has been reached further comprises stopping the active response operation.

6. The method of claim 1, further comprising determining that a maximum allowed CT temperature threshold has been exceeded and responsively reinitializing the CT treatment period.

7. The method of claim 1, further comprising determining that a maximum allowed CT temperature threshold has been exceeded and responsively stopping the active response operation.

8. The method of claim 4, further comprising reporting the received temperature signals, the first set point change command, and the second set point change command, to a remote computer, by transmissions over the telematics unit.

9. A system for cold treatment (CT) of refrigerated cargo during shipment of a refrigeration container, comprising:
- a plurality of temperature probes suitable to be located in the refrigeration container;
- a refrigeration controller, configured to receive signals from standard refrigeration sensors, temperature signals from the plurality of temperature probes, and temperature set point adjustment commands, to control a refrigeration unit of the refrigeration container;
- a telematics unit, collocated with the refrigeration controller and configured to receive remote communications; and
- an active response controller having one or more processors and having memory storage, the memory storage comprising instructions that when executed by the one or more processors implement steps comprising:
  - receiving, through the telematics unit, a set point adjustment protocol including multiple rules for modifying set points of the refrigeration controller, wherein conditions of the rules include temperature thresholds and temperature trend triggers, wherein temperature trend triggers are rates of temperature change; and
  - during a period of active response operation, receiving temperature signals, determining that one or more of the received temperature signals exceeds a temperature threshold of a rule of the multiple rules defined by the set point adjustment protocol, determining that a temperature trend of the one or more of the received temperature signals meets a trend trigger of the rule, and responsively to the temperature threshold and the trend trigger transmitting a set point change command of the rule to the refrigeration controller.

10. The system of claim 9, wherein the instructions further comprise reporting the received temperature signals, and the set point change command to a remote computer, by transmissions over the telematics unit.

11. The system of claim 9, wherein the active response controller is configured to determine that a CT treatment period defined in the set point adjustment protocol has been reached and responsively transmitting a second set point change command to the refrigeration controller to increase the refrigeration controller set point to a post-CT treatment period temperature.

12. The system of claim 9, wherein the instructions further comprise determining that a maximum allowed CT temperature threshold has been exceeded and responsively stopping the active response operation.

13. The system of claim 9, wherein the instructions further comprise determining that a maximum allowed CT temperature threshold has been exceeded and responsively reinitializing the CT treatment period.

\* \* \* \* \*